(12) United States Patent
Watts et al.

(10) Patent No.: US 7,706,519 B2
(45) Date of Patent: Apr. 27, 2010

(54) ASSEMBLY, AND ASSOCIATED METHOD, FOR TELEPHONIC CALL CONNECTION WITH A VIRTUALLY-RESIDENT TELEPHONIC STATION

(75) Inventors: Ronald F. Watts, Lewisville, TX (US); Gilman R. Steven, Fairview, TX (US)

(73) Assignee: Alcatel Lucent, Paris (FR)

( * ) Notice: Subject to any disclaimer, the term of this patent is extended or adjusted under 35 U.S.C. 154(b) by 1587 days.

(21) Appl. No.: 10/612,471

(22) Filed: Jul. 2, 2003

(65) Prior Publication Data

US 2005/0002378 A1  Jan. 6, 2005

(51) Int. Cl.
*H04M 7/00* (2006.01)

(52) U.S. Cl. .............................. 379/221.14; 379/220.01; 379/221.15

(58) Field of Classification Search .............. 379/88.13, 379/207.02, 207.11, 211.02, 221.09, 221.13; 370/352, 401, 220.01–221.02, 221.08–221.15, 370/901
See application file for complete search history.

(56) References Cited

U.S. PATENT DOCUMENTS

| | | | |
|---|---|---|---|
| 5,485,512 A * | 1/1996 | Bogart et al. .......... | 379/221.14 |
| 5,889,845 A * | 3/1999 | Staples et al. .......... | 379/211.02 |
| 6,345,049 B1 | 2/2002 | Matsuo et al. | |
| 6,438,220 B1 | 8/2002 | Liu | |
| 6,711,155 B1 * | 3/2004 | Himbeault et al. .......... | 370/352 |
| 2001/0055299 A1 | 12/2001 | Kelly | |
| 2003/0165145 A1 * | 9/2003 | Cho .......................... | 370/401 |
| 2004/0234061 A1 * | 11/2004 | Koch et al. ............. | 379/207.02 |
| 2007/0274474 A1 * | 11/2007 | Singh et al. ............... | 379/88.13 |

* cited by examiner

*Primary Examiner*—MD S Elahee
(74) *Attorney, Agent, or Firm*—RG + Associates LLC

(57) ABSTRACT

An assembly, and an associated method, by which to place a telephonic station in virtual residency in a telephonic network. The virtually-resident telephonic station is coupled to a packet data network, such as the Internet backbone. The virtually-resident telephonic station has packet network address determined by the location of its connection to the packet data network. An index, formed by an indexer, is maintained at a proxy server embodied at the packet data network. When a call is placed by a calling station for connection with the virtually-resident telephonic station, the call is routed to the packet data network, and the index is accessed to ascertain the address of the virtually-resident telephonic station. When the address is ascertained, the call is routed to the virtually-resident telephonic station, and the call connection is completed.

20 Claims, 3 Drawing Sheets

ASSEMBLY, AND ASSOCIATED METHOD, FOR TELEPHONIC CALL CONNECTION WITH A VIRTUALLY-RESIDENT TELEPHONIC STATION

The present invention relates generally to a manner by which to effectuate telephonic communications with a telephonic station, virtually-resident in a first telephonic network of a communication network. More particularly, the present invention relates to an assembly, and an associated method, by which to route a call to the telephonic station when the telephonic station is connected at any selected location in a packet data network that also forms part of the communication network.

The virtually-resident telephonic station need not be maintained at a single fixed location. Calls are routable thereto without the need to use expensive, call-forwarding operations, to use an FX line, or to purchase a toll-free number, otherwise conventionally required. When a call is placed to the virtually-resident, telephonic station, a calling party enters a dialing number associated with the virtually-resident telephonic station in the first telephonic network. Routing of the call through the communication network to the virtually-resident telephonic station, connected at any location of the packet data network, is performed to complete a call connection therebetween.

BACKGROUND OF THE INVENTION

Communication of data is an endemic part of modern society. And, access to communication systems through which to communicate data pursuant to effectuation of communication services is a practical necessity for many. A telephonic communication system is exemplary of a type of communication system that has been widely employed and is regularly utilized by many through which to effectuate communications.

When installed and made operational, a telephonic communication system provides for the telephonic communication of voice, as well as non-voice, data. Networks of telephonic communication systems have been installed throughout significant portions of the populated portions of the world. Users of such telephonic communication systems communicate telephonically therethrough through the use of telephonic, or other communication, stations that are connected to the telephonic networks. Through appropriate interconnection of separate telephonic networks, telephonic communications are effectable between telephonic stations positioned at disparate locations by way of the interconnected, telephonic networks.

Conventional telephonic networks are predicated upon circuit-switched communication techniques. That is to say, conventional telephonic networks create circuit-switched connections between telephonic stations between which communication services are to be effectuated. Once circuit-switched connections are formed there between, dedicated, i.e., circuit-switched, channels are allocated to the telephonic stations by which to communicate data therebetween. For so long as a circuit-switched connection is maintained, telephonic communications between the telephonic stations is permitted. However, the connection is maintained irrespective of the amount, or regularity, of the communication of data therebetween. Data forming telephonic communications might only be intermittently communicated between the telephonic stations to which the dedicated connection is provided. As a result, the communication capacities of communication systems that utilize circuit-switched connections oftentimes underutilize the communication capacities of the communication channels formed pursuant to such connections. In other words, use of circuit-switched connections sometimes inefficiently utilizes the communication capacity of a telephonic network.

In contrast, communication schemes that provide for shared-channel communications generally are better able to utilize the communication capacity of a communication system, such as a telephonic communication system. Shared channels are utilized in packet-based communication systems. In a packet-based communication system, packet-formatted data is communicated. Packet-formatted data can be communicated during discrete intervals. And, the same channel can be utilized to communicate packet-formatted data, transmitted during separate time periods to effectuate communication services pursuant to separate communication sessions. In contrast to conventional, circuit-switched communication schemes, a communication system that utilizes packet-switched communication schemes are able more efficiently to utilize the communication capacity allocated to a communication system.

The packet-formatted data is formatted pursuant to a selected formatting protocol. Various packet formatting protocols have been promulgated and standardized. One protocol scheme, referred to as the Internet protocol (IP), or IP protocol, is a formatting scheme that is regularly utilized in many communication systems. Communication devices and apparatus are constructed to format and send, to receive, to transport, and to operate upon, IP-formatted data.

Packet-based, communication schemes are utilized in communication effectuated by way of the Internet backbone. Communications effectuable by way of the Internet backbone include voice, non-voice, as well as multimedia communication services through the communication of packet-formatted data using packet-switched connections.

The Internet backbone is representative of a packet data network or "fabric" through which packet-switched channels are formed. The Internet, or other packet data network is coexistent with conventional, circuit-switched telephonic networks, i.e., "legacy" networks. Circuit-switched, e.g., TDM (time division multiplexed) telephonic networks are connected to packet data networks by way of devices referred to as gateways. The gateways form gateways to the packet data network from telephonic networks and vice versa. Protocol translations, as well as other operations, for instance, voice encoding operations, are performed by the gateways.

In addition to more efficient utilization of communication resource allocations, the use of IP-based, and other, packet-switched communication schemes in packet data networks provide other advantages, including improved adaptability and flexibility of configuration and reconfiguration.

Telephonic access to a telephonic station that is moved, to be placed in another location of a packet data network, is relatively easily effectuated. In contrast, in a circuit-switched communication system, corresponding access is not as easily effectuated. Conventionally, subscription to a call forwarding service, or purchase of a toll-free number, or lease of an FX line is required. Call forwarding might result in a large toll bill to a customer for whom the call is forwarded. Additionally, local phone service charges might also be incurred. A toll free number is also relatively expensive. And, if a local presence is intended, use of a toll free number would be contradictory to such a goal. And, use of an FX line is also relatively expensive and is implementable over only a short distance, e.g., a few miles.

Due to the co-existence of both the legacy networks and the packet data networks, a possibility exists that some of the advantages inherent of a packet data network might also be advantageously utilized in conjunction with a legacy network.

If, for instance, the ease of adaptability of changing locations at which a telephonic station of a packet data network can be applied in some manner to facilitate cost-effective routing of calls in a legacy network coupled to a packet data network, improved communication services could be provided to the legacy network.

It is light of this background information related to telephonic communication networks that the significant improvements of the present invention have evolved.

SUMMARY OF THE INVENTION

The present invention, accordingly, advantageously provides an assembly, and an associated method, by which to effectuate telephonic communications with a telephonic station virtually-resident in a first telephonic network of a communication network.

Through operation of an embodiment of the present invention, a manner is provided by which to route a call to the telephonic station when the telephonic station is connected at any selected location in a packet data network that also forms part of the communication network.

In one aspect of the present invention, a calling party positioned at a calling station coupled to the first telephonic network, initiates a call by entering a dialing number. The dialing number entered by the calling party corresponds to the dialing number associated with the virtual residency of the telephonic station in the first telephonic network.

The call is routed through the first telephonic network to the packet data network. And, then, the location of the virtually-resident telephonic station in the packet data network is ascertained. Once the address of the virtually-resident telephonic station is ascertained, the call is routed through the packet data network. And, a call connection is formed.

In another aspect of the present invention, the virtually-resident telephonic station is identified by more than one dialing number in the first telephonic network. When the telephonic network is formed multiple network portions, separate dialing numbers are associated with separate ones of the network portions. Thereby, the virtually-resident telephonic station appears to be resident in each of the network portions at which a local dialing code is associated therewith. A calling party connected to one of the network portions at which the virtually-resident telephonic station has local dialing code associated therewith is able thereby to place a call to the virtually-resident telephonic station through entry of the dialing digits, local to the network portion to which the calling station is connected. Minimal, or no, charges, accrue to the calling party or to the user of the virtually-resident telephonic station.

The first telephonic network is, for example, a TDM (time division multiplexed) telephonic network having telephonic switches for routing calls that are placed by calling stations coupled thereto. The telephonic network also includes a service control point (SCP), and the first telephonic network is coupled to a packet data network by way of a gateway. The gateway is identified by a gateway address. A database is maintained at the service control point that associates dialing codes associated with the virtually-resident telephonic station with the address of the gateway that connects the first telephonic network with the packet data network. When the virtually-resident telephonic station is identified by more than one dialing code in the telephonic network, the database of the service control point associates all of the dialing codes with the gateway address. Or, when the first telephonic network is formed of a plurality of network portions, separate service control points, associated with each of the network portions are used, in one embodiment. Each service control point contains a database associating the address of the gateway together with the dialing code used in the individual network portion to identify the virtually-resident telephonic station. The database is accessed at a telephonic switch to which the call is routed. And, once the identity of the gateway address is ascertained, the call is routed to the gateway.

In another aspect of the present invention, the packet data network includes a proxy server, or a functional equivalent thereof. The proxy server includes an indexer that indexes together the address at which the virtually-resident telephonic station is indexed together with the dialing codes associated with the telephonic station used in the first telephonic network. The gateway accesses the index formed thereat to obtain the location of the virtually-resident telephonic station. And, upon ascertaining the address of the telephonic station, the call is routed thereto.

The virtually-resident, telephonic station is positionable at any location in the packet data network and subsequently positionable at another selected location of the packet data network. When the telephonic station is repositioned, the proxy server at which the indexer is embodied is updated with the updated address of the telephonic station. When the packet data network forms the Internet backbone, the user of the virtually-resident telephonic network is positionable at any location to which access to the Internet is permitted. And, the telephonic station remains virtually-resident in the first telephonic network.

In these and other aspects, therefore, an assembly, and an associated method, is provided for a communication network. The communication network has at least a first calling station connected to a first telephonic network and a service-user calling station connected to a packet-based network. Call connection between the first calling station and the service-user calling station is facilitated. The service-user calling station has at least a first virtual-calling station identity in the first telephonic network. An indexer is embodied at the packet-based network. The indexer indexes together the at least first virtual-calling station identity of the service-user calling station with a selected packet-based network identity of the service-user calling station. The packet-based-network identity is associated with logical connection of the service-user calling station to the packet data network. The indexer is accessed pursuant to call routing of a call between the first calling station and the service-user calling station to permit effectuation of the call connection there between.

A more complete appreciation of the present invention and the scope thereof can be obtained from the accompanying drawings that are briefly summarized below, the following detailed description of the presently preferred embodiments of the invention, and the appended claims.

DETAILED DESCRIPTION

Figure 1:
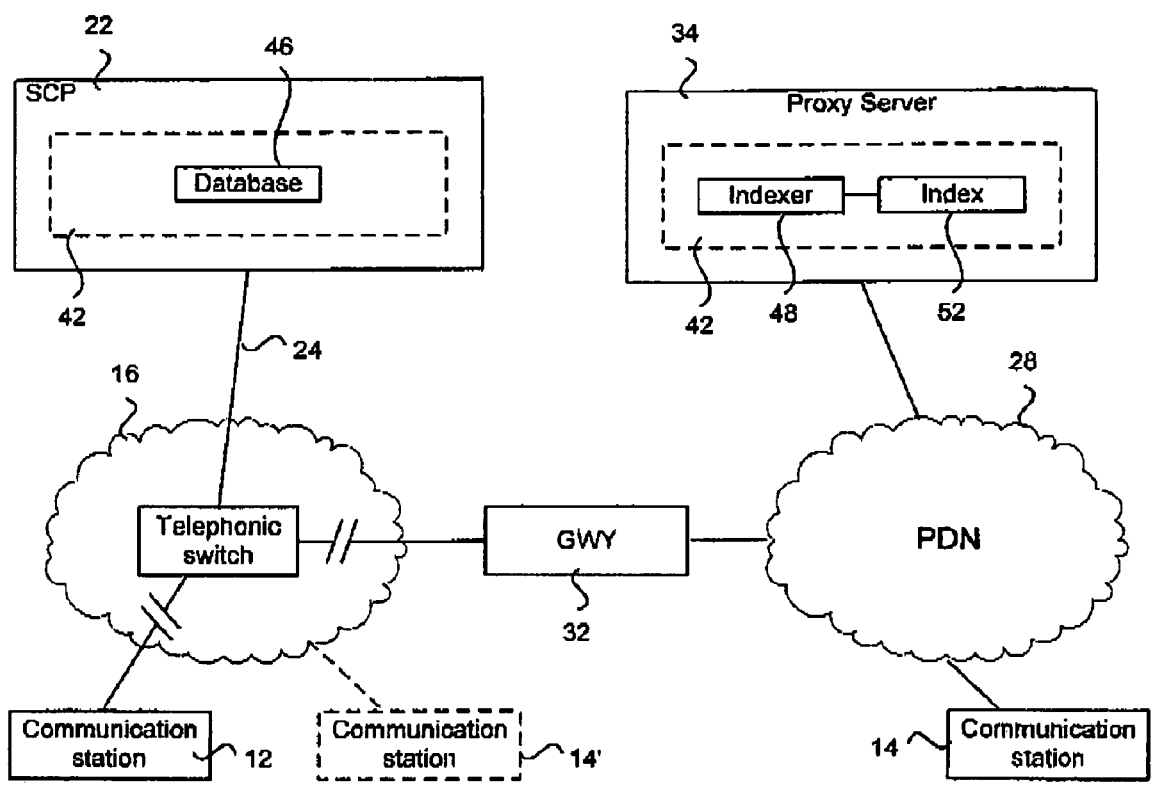
FIG. 1 illustrates a functional block diagram of a communication network in which an embodiment of the present invention is operable.

Referring first to FIG. 1, a communication network, shown generally at 10, provides for telephonic communications between communication stations, of which the communication stations 12 and 14 are exemplary. During operation of the communication network, calls are placed by a calling station, such as either of the telephonic communication stations 12 and 14, and, once a call connection is formed, both voice and non-voice data is communicated between communication stations coupled to the communication network.

In the exemplary implementation, the communication network is formed of a conventional, TDM (time division multiplexed) telephonic network 16 that provides for conventional circuit-switched connections by which dedicated communication channels are defined and upon which data is communicated during a call to effectuate a telephonic communication service. In one embodiment, the telephonic network 16 is representative of a multiple-network formed of a plurality of network portions connected theretogether. Telephonic switches are embodied at the telephonic network, and the telephonic switch 18 is representative of any of the telephonic switches thereof. The telephonic switch performs switching operations, conventionally performed in a circuit-switched telephonic network.

The telephonic network 18 also includes a service control point (SCP) 22. The service control point is accessible by the telephonic switch, and the line 24 extending therebetween is representative of the accessibility of the service control point to the switch.

The communication network also includes a packet data network 28. The packet data network is formed, for example, of the Internet backbone. The packet data network is connected to the telephonic network 16 by way of a gateway (GWY) 32. Devices are coupled to the packet data network to form portions thereof. Here, a proxy server 34 is coupled to the packet data network. Call connections are formable between the communication stations 12 and 14 through the telephonic network 16, the gateway 32, and the packet data network 28. And, in the exemplary implementation, the telephonic communication station 14 forms a SIP (Session Initiation Protocol) phone.

Through operation of an embodiment of the present invention, the calling station 14 appears to be resident with the telephonic network 16 to a calling party, such as a calling party that initiates a call at the telephonic station 12 even though the telephonic station 14 is, instead, coupled to the packet data network 28. That is to say, the telephonic station 14 is virtually-resident, indicated by the element 14' with the telephonic network 16.

Pursuant to an embodiment of the present invention, the virtual residency of the telephonic station 14 in the telephonic network 16, the communication network includes an assembly 42. The assembly 42 is functionally represented, and the entities of which the assembly is shown to be formed are implementable in any desired manner including processing circuitry and associated circuitry at which algorithms are executed to perform the various functions of the respective entities. In the exemplary implementation, the assembly includes distributed portions, embodied at the service control point 22 and at the proxy server 24. In other implementations, the entities of which the assembly 42 are formed are implemented elsewhere.

A portion of the assembly 42 is embodied at the telephonic network 16 and here form a portion of the service control point 22. The assembly here includes a database 46 that is accessed when a call is placed to the virtually-resident telephonic station 14. the database includes a listing of dialing codes associated with the virtually-resident telephonic station together with a gateway address identifying the gateway 32. The contents of the database are accessible, for instance, by way the line 24, functionally connecting the service control point and the telephonic switch 18 theretogether.

The assembly 42 further includes an indexer 48 embodied at the proxy server 34. The indexer operates to form an index 52 that indexes together dialing codes associated with the virtually-resident telephonic station 14 and the address of the virtually-resident telephonic station in the packet data network 18. Because the telephonic station 14 is positionable, and subsequently repositionable, at separate network locations of the packet data network, the contents of the index are updateable by the indexer. When, for instance, the virtually-resident telephonic station is repositioned in the packet data network to be identified by a new address, indications of the updated address are routed through the packet data network and provided to the proxy server. The indexer 48 of the apparatus 42 detects the updated address and causes the contents of the index 52 to be altered appropriately.

When the telephonic station 14 is identified in the telephonic network 16 by more than one dialing code, the indexer indexes together with the address of the telephonic station in the packet data network each of the dialing codes associated with the virtually-resident telephonic station. When the packet data network is formed of the Internet backbone, or other network that utilizes IP (Internet protocol)—formatted data messages, the telephonic station 14 is identified with an IP address, such as an Ipv4 or Ipv6 address. The address is assigned, in conventional manner, to the telephonic station, conventional of other devices connectable to the packet data network.

Because the telephonic station 14 is virtually-resident in the telephonic network 16, the telephonic station appears, to other calling stations of the telephonic network 16, to be local to the network. Through appropriate selection of the dialing code to be used to identify the telephonic station, the telephonic station is made, for instance, to appear to be located in the same locale as that of selected other calling stations. And, if the telephonic network 16 is representative of a plurality of network portions, the telephonic station 14 can be assigned at least a corresponding number of dialing codes. Thereby, the telephonic station is made to appear to be local to network portion.

When a call, originated at the calling station 12, is to be placed to the telephonic station 14, a calling party enters the dialing digits at the calling station 12 in conventional manner. That is to say, the call connection is initiated in conventional manner, and, once the dialing digits are entered, the call is routed to a telephonic switch, here represented by the telephonic switch 18. When the dialing code is applied to the telephonic switch, the telephonic switch accesses the service control point, here by way of the line 24. The database 46 embodied at the service control point is accessed, and the values of the dialing code are searched in the database to determine the gateway address associated with the dialing code. When the association is located, the values of the address of the gateway 32 associated together with the dialing code is returned to the telephonic switch. And, the telephonic switch routes the call to the gateway identified by the gateway address.

The call is routed to the gateway device, here the gateway 32, and the gateway then inquires of the proxy server 42 to where to route the call. That is to say, the gateway sends an inquiry to the proxy server to access the index 52 formed thereat. The proxy server, upon detection of the inquiry, searches the index for values of the calling code entered at the calling station 12 and routed pursuant to the call to the gateway. When the address, indexed together with the calling code values are located, values are retrieved and returned to the gateway 32. And, when the gateway receives the address of the telephonic station 14, the gateway routes the call to the telephonic station 14 at the address indicated in the index. And, thereafter, a call connection is completed, and telephonic communications are effectuated between the telephonic stations 12 and 14. The calling party at the calling station 12 need not be aware that the telephonic station 14 is not, or is not necessarily, local thereto. And, the call connection is made without the need for the virtually-resident telephonic station to subscribe to call-forwarding, or the use of an FX line, or the use a toll-free number.

Calls also are originated by the telephonic station 14 for routing to telephonic stations connected to the telephonic network 16. The call routing of such calls are effectuated in directions essentially reverse to the call routing just-described. And, more generally, call routing of a call placed by the telephonic station 14 for connection with a telephonic station located in the telephonic network 16 is routed in manners used by existing, so-called packet phones.

Figure 2:
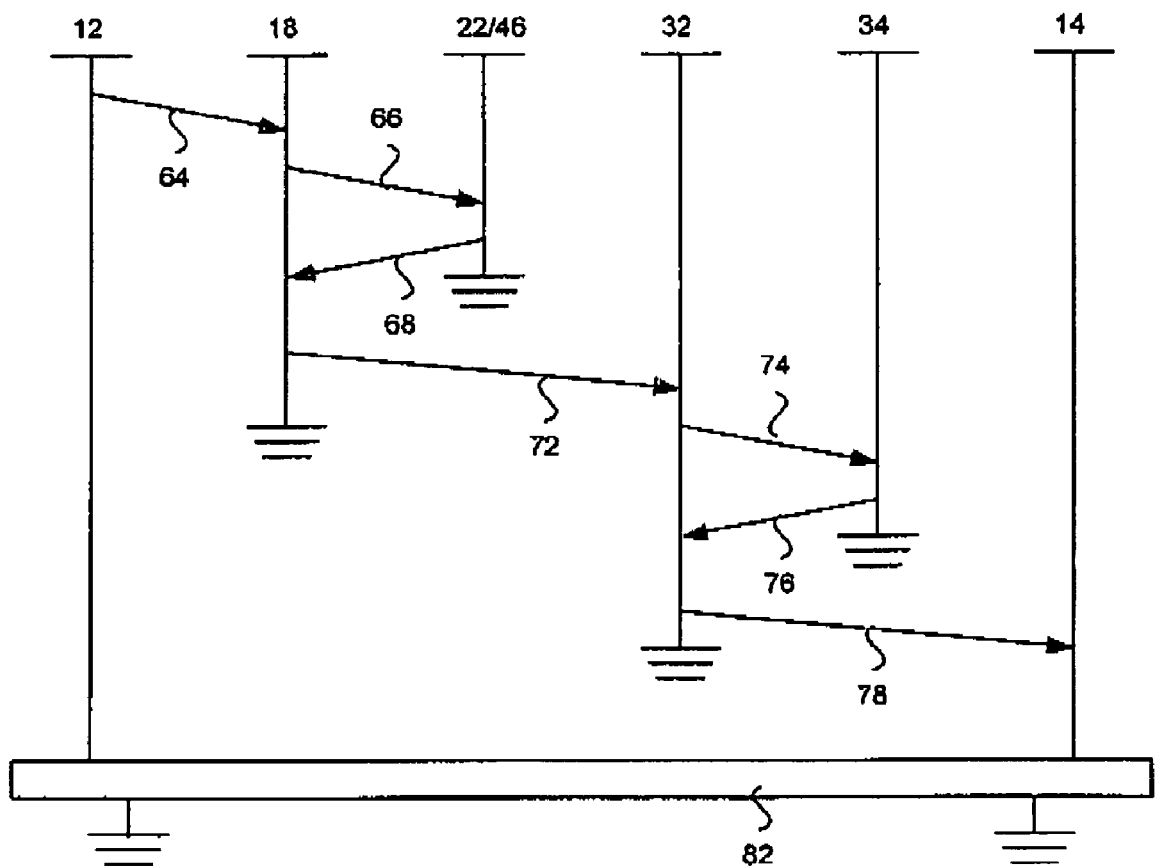
FIG. 2 illustrates a message sequence diagram representative of signaling generated in the communication network shown in FIG. 1 by which to route a call pursuant to operation of an embodiment of the present invention.

FIG. 2 illustrates a message sequence diagram, shown generally at 62, representative of call routing of an exemplary call placed by the telephonic station 12 forming part of the communication network shown in FIG. 1. When the call is placed, a calling party enters dialing codes associated with the virtually-resident telephonic station 14, and the call placement is routed, indicated by the segment 64, to the telephonic switch 18. The telephonic switch 18 inquires, indicated by the segment 66, of the database 46 embodied at the service control point 22 of the subsequent routing of the call. The database is searched, and a gateway address associated with a gateway, here the gateway 22, to which to route the call is ascertained. And, as indicated by the segment 68, indications of the gateway address are returned to the telephonic switch. Once the address is identified to the telephonic switch, the telephonic switch routes the call, indicated by the segment 72 to the gateway 32.

Once the call is routed to the gateway, the gateway inquires, indicated by the segment 74, of the proxy server of the address associated with the telephonic station. A search is performed of the database, the address of the telephonic station is ascertained, and indications of the address are returned, indicated by the segment 76, to the gateway 32. And, upon delivery of the address of the telephonic station thereto, the call is routed, indicated by the segment 72, to the telephonic station 14. Thereafter, a call connection is completed, and a telephonic communication session, indicated by the block 82 is commenced.

Figure 3:
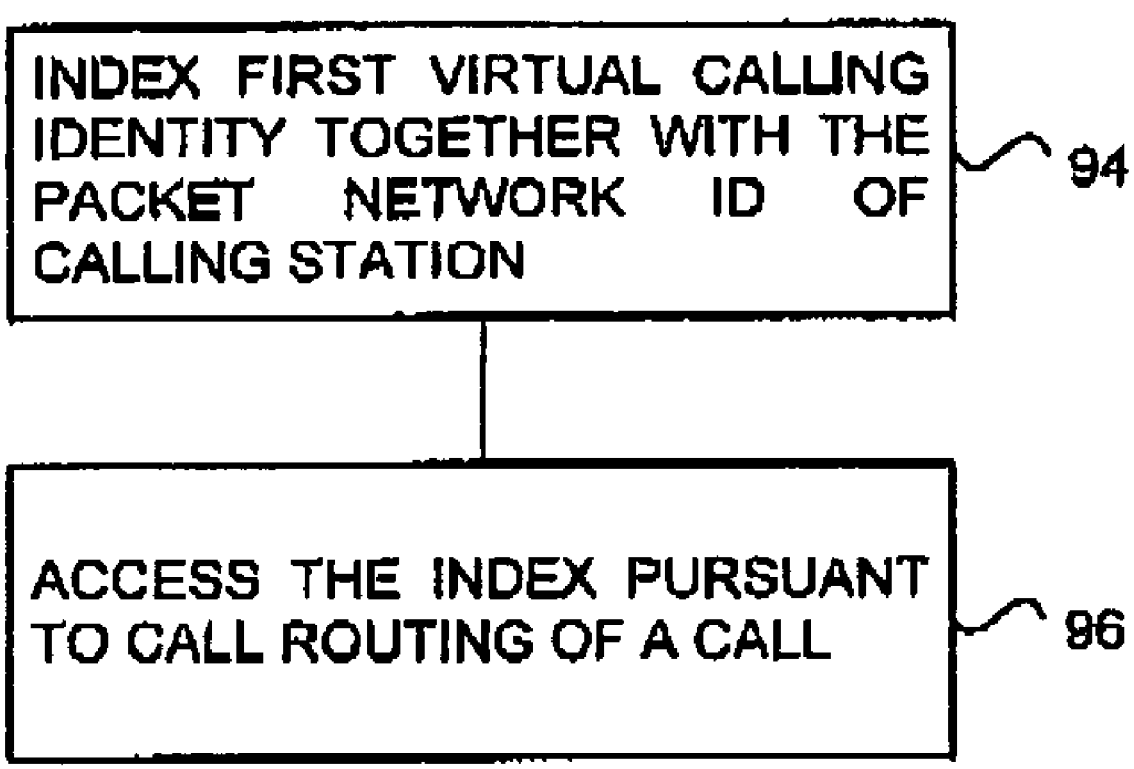
FIG. 3 illustrates a method flow diagram listing the method steps of the method of operation of an embodiment of the present invention.

FIG. 3 illustrates a method flow diagram, shown generally at 92, representative of the method of operation of the method of an embodiment of the present invention. The method facilitates call connection between a first calling station and a service-user calling station. The first calling station is coupled to a first telephonic network, and the service-user calling station has at least a first virtual calling-station identity in the first telephonic network and is coupled to a packet data network.

First, and as indicated by the block 94, the first virtual calling station identity of the service user calling station is indexed together with a selected packet-based network identity of the service-user calling station. An index is formed thereby. The packet-based network identity is associated with logical connection of the service user calling station to the packet data network.

Then, and as indicated by the block 96, the index is accessed pursuant to call routing of a call between the first calling station and the service user calling station to permit the effectuation of the call connection therebetween.

Thereby, a manner is provided by which to permit a telephonic station to be virtually-resident in a telephonic network while permitting the telephonic station to be physically located at another location. The need for call forwarding, toll-free numbers, or FX lines are obviated, and a cost-effective implementation is provided.

The previous descriptions are of preferred examples for implementing the invention, and the scope of the invention should not necessarily be limited by this description. The scope of the present invention is defined by the following claims:

We claim:

1. In a communication network having at least a first calling station connected to a first telephonic network and a service-user calling station automatically connected to a packet-based network, an improvement of an assembly for facilitating call connection between the first calling station and the service-user calling station, the service-user calling station having at least a first virtual calling-station identity in the first telephonic network such that the service-user calling station appears virtually resident in the first telephonic network, said assembly comprising:
   a virtual-location indexer embodied at the packet-based network, said indexer for automatically indexing together the at least the first virtual calling-station identity of the service-user calling station with a selected packet-based-network identity of the service-user calling station,
   the packet-based-network identity automatically associated with logical connection of the service-user calling station to the packet data network and the virtual calling-station identity associated with a virtual residency location of the service-user calling station in the first telephonic network,
   said indexer automatically accessed pursuant to call routing of a call between the first calling station and the service-user calling station to permit effectuation of the call connection therebetween, wherein the call connection is local to the first telephonic network, while permitting the service-user calling station to be physically located at another location.

2. The assembly of claim 1 wherein the service-user calling station is logically connectable to the packet data network at any of a first logical location and at least a second logical location and wherein the selected packet-based-network identity of the service-user calling station is associated with a selected one of the first logical location and the second logical location at which the service-user calling station is connected to the packet data network.

3. The assembly of claim 2 wherein the service-user calling station is moveable, separately connectable at the first logical location and at the at least the second logical location, and wherein the selected packet-based network identity indexed together by said virtual location indexer is updateable responsive to movement and connection of the service-user calling station separately at the first logical location and at the at least the second logical location.

4. The assembly of claim 1 wherein the packet data network comprises a proxy server and wherein said virtual location indexer is embodied at the proxy server.

5. The assembly of claim 1 wherein the packet-based-network identity of the service-user calling station indexed by said virtual location indexer comprises an IP-address.

6. The assembly of claim 5 wherein the service-user calling station operates pursuant to an SIP (session initiation protocol) and wherein the packet-based-network identity of the service-user calling station indexed by said virtual location indexer comprises a SIP IP-address.

7. The assembly of claim 1 wherein the packet-based-network further comprises a gateway that couples the first telephonic network together with the packet-based network wherein a call to the service-user calling station by the first calling station is routed to the gateway and wherein said gateway accesses said virtual location indexer to obtain the selected packet-based network identity of the service-user calling station to route the call thereto.

8. The assembly of claim 7 wherein the first telephonic network comprises a service control point, wherein the gateway is identified by a gateway address, wherein the call to the service-user calling station by the first calling station is caused to be routed by the service control point to the gateway.

9. The assembly of claim 8 wherein the call to the service-user calling station is initiated by the first calling station through entry thereat of the first virtual calling-station identity and wherein the assembly further comprises a database embodied at the service control point, the database comprising a map that maps the first virtual calling-station identity together with the gateway address.

10. The assembly of claim 9 wherein the at least the first virtual calling-station identity of the service-user calling station comprises the first virtual calling-station identity and at least a second virtual calling-station identity and wherein the map formed of said database maps all of the first and at least second calling-station identities of the service-user calling station together with the gateway address.

11. The assembly of claim 1 wherein the first telephonic network comprises a TDM (time division multiplexed) network having a TDM switch and wherein a call placed by the first calling station to the service-user calling station is routed by the TDM switch to the packet data network and wherein, once delivered to the packet data network, the selected packet-based-network identity indexed together at said virtual location indexer is determined, and the call is routed thereto.

12. In a method of communicating in a communication network having at least a first calling station connected to a first telephonic network and a service-user calling station automatically connected to a packet-based-network, an improvement of a method for facilitating call connection automatically between the first calling station and the service-user calling station, the service-user calling station having at least a first virtual calling-station identity in the first telephonic network such that the service-user calling station appears virtually resident in the first telephonic network, said method comprising:

automatically indexing together the at least the first virtual calling-station identity of the service-user calling station with a selected packet-based-network identity of the service-user calling station, the packet-based-network identity automatically associated with logical connection of the service-user calling station to the packet data network and the virtual calling-station identity associated with a virtual residency location of the service-user calling station in the first telephonic network; and accessing the indexed formed during said operation of indexing pursuant to call routing of a call between the first calling station and the service user calling station to permit the automatic effectuation of the call connection therebetween, wherein the call connection is local to the first telephonic network, while permitting the service-user calling station to be physically located at another location.

13. The method of claim 12 further comprising the operation of initiating a call by the first communication station to the service-user calling station through entry of indicia of a selected one of the at least the first calling-station identity.

14. The method of claim 13 wherein the communication network comprises a gateway coupling the first telephonic network with the packet data network, wherein the call initiated during said operation of initiating is routed to the gateway and wherein said operation of accessing is performed by the gateway.

15. The method of claim 14 comprising the further operation, subsequent to said operation of accessing, of routing the call to an address identified in the index accessed during said operation of accessing to be associated with the at least the first virtual calling-station identity.

16. The method of claim 12 wherein the service-user calling station is logically connectable to the packet data network at any of a first logical location and at least a second logical location and wherein said method further comprises the operation of updating the index formed during said operation of indexing when the service-user calling station is reconnected out of one of the first and at least second logical locations and connected into another one of the first and at least second logical locations.

17. The method of claim 16 wherein the packet data network comprises a proxy server and wherein the index formed during said operation of indexing is embodied at the proxy server.

18. The method of claim 12 wherein the at least the first virtual calling station identity comprises the first calling station identity and at least a second virtual calling station identity and wherein the index formed during said operation of indexing indexes all of the first and at least second virtual calling stations together with the selected packet-based-network identity.

19. The method of claim 17 wherein the first telephonic network further comprises a service control point and wherein said method further comprises the operation of creating a database at the service control point, wherein the gateway is identified by a gateway address and wherein said method further comprises the operation of creating a database having a map that maps the first virtual calling-station identity together with the gateway address.

20. The method of claim 19 further comprising the operation of accessing the database to route the call to the gateway.

* * * * *